(12) United States Patent
Zhao et al.

(10) Patent No.: US 9,946,320 B2
(45) Date of Patent: Apr. 17, 2018

(54) INFORMATION PROCESSING METHOD AND ELECTRONIC APPARATUS

(71) Applicant: Lenovo (Beijing) Co., Ltd., Beijing (CN)

(72) Inventors: Qian Zhao, Beijing (CN); Yawei Cheng, Beijing (CN)

(73) Assignee: LENOVO (BEIJING) CO., LTD., Haidian District, Beijing (CN)

(*) Notice: Subject to any disclaimer, the term of this patent is extended or adjusted under 35 U.S.C. 154(b) by 229 days.

(21) Appl. No.: 14/469,147

(22) Filed: Aug. 26, 2014

(65) Prior Publication Data
US 2015/0100804 A1   Apr. 9, 2015

(30) Foreign Application Priority Data
Oct. 8, 2013 (CN) .......................... 2013 1 0464109

(51) Int. Cl.
*G06F 1/32* (2006.01)

(52) U.S. Cl.
CPC .......... *G06F 1/3206* (2013.01); *G06F 1/3287* (2013.01); *Y02B 60/1282* (2013.01)

(58) Field of Classification Search
CPC ........ G06F 1/32; G06F 1/3206; G06F 1/3287; Y02B 60/1282; H04W 52/00; H04W 52/0225
See application file for complete search history.

(56) References Cited

U.S. PATENT DOCUMENTS

| | | | | |
|---|---|---|---|---|
| 2004/0212677 A1* | 10/2004 | Uebbing | ................ | H04N 7/181 348/155 |
| 2008/0234935 A1* | 9/2008 | Wolf | ...................... | G01C 21/16 701/472 |
| 2012/0147531 A1* | 6/2012 | Rabii | ................ | H04W 52/0254 361/679.01 |

(Continued)

FOREIGN PATENT DOCUMENTS

| CN | 101465100 A | 6/2009 |
|---|---|---|
| CN | 103262620 A | 8/2013 |

OTHER PUBLICATIONS

Office Action, and English language translation thereof, in corresponding Chinese Application No. 20130464109.6, dated Aug. 18, 2016, 24 pages.

(Continued)

*Primary Examiner* — Fahmida Rahman
(74) *Attorney, Agent, or Firm* — Brinks Gilson & Lione; G. Peter Nichols

(57) ABSTRACT

An information processing method and an electronic apparatus are described to reduce the power consumption of electronic apparatus. The method is applied to an electronic apparatus that includes a processing module with at least two sensing units corresponding to at least two power consumption grades. The method includes, when the N sensing units among the at least two sensing units are in an OFF state and the M sensing units among the at least two sensing units are in an ON state, obtaining a first parameter through at least one sensing unit among the M sensing units; determining whether the first parameter satisfies a first predetermined condition; if so, controlling N1 sensing units among the N sensing units to be in the ON state, wherein N1 is a positive integer less than or equal to N.

10 Claims, 3 Drawing Sheets

(56) References Cited

U.S. PATENT DOCUMENTS

| | | | |
|---|---|---|---|
| 2013/0004016 A1* | 1/2013 | Karakotsios | G06K 9/00355 382/103 |
| 2013/0063611 A1* | 3/2013 | Papakipos | G06F 1/1686 348/207.11 |
| 2014/0179298 A1* | 6/2014 | Grokop | G01S 19/48 455/418 |

OTHER PUBLICATIONS

Second Office Action (27 pages) dated Apr. 5, 2017 out of Chinese priority application 201310464109.6.

* cited by examiner

INFORMATION PROCESSING METHOD AND ELECTRONIC APPARATUS

BACKGROUND

This application claims priority to of Chinese Patent Application No. 201310464109.6 filed on Oct. 8, 2013, the entire contents of which are incorporated herein by reference.

The present application relates to a field of electronic technologies, and more particularly, to an information processing method and an electronic apparatus.

With a rapid development of electronic technologies, functions of various electronic apparatuses also become more and richer and humanized, so that users have a better experience during a usage of the electronic apparatus. Take mobile phones as example, current smart phones can be said to have been improved into a small computer, they not only have a strong storage space where a variety of software could be installed, and also various functions of the mobile phones are made more and more sophisticated and user-friendly.

In the prior art, in order to achieve various functions of the electronic apparatus, typically, a variety of sensing units are included in the electronic apparatus, such as acceleration sensing unit, light sensing unit, capacitive sensing unit, and so on. Usually, these sensing units will be integrated onto a single chip to facilitate controlling these sensing units.

The applicant of the present application has found that the prior art at least has technical problem as follows: since the electronic apparatus includes a plurality of sensing units in the prior art, and these sensing units all are in an ON state, it results in the technical problem of existence of relatively high power consumption of the electronic apparatus.

SUMMARY

Embodiments of the present application provide an information processing method and an electronic apparatus to solve the technical problem that power consumption of electronic apparatus in the prior art is relatively high.

According to a first aspect of the present application, there is provided an information processing method applied to an electronic apparatus, the electronic apparatus including a processing module that includes at least two sensing units corresponding to at least two power consumption grades, the at least two sensing units at least including M sensing units whose power consumption grades are a first grade and N sensing units whose power consumption grades are a second grade, the first grade corresponding to a first power consumption and the second grade corresponding to a second power consumption greater than the first power consumption, M and N are a positive integer, the method comprising: when the N sensing units are in an OFF state and the M sensing units are in an ON state, obtaining a first parameter through detection of at least one sensing unit among the M sensing units: determining whether the first parameter satisfies a first predetermined condition; when the first parameter satisfies the first predetermined condition, controlling N1 sensing units among the N sensing units to be in the ON state, wherein N1 is a positive integer less than or equal to N.

In conjunction with the first aspect, in a first possible implementation, after controlling N1 sensing units among the N sensing units to be in the ON state, the method further comprises: obtaining a second parameter through acquisition of the N1 sensing units; determining whether the second parameter satisfies a second predetermined condition; when the second parameter satisfies the second predetermined condition, controlling the electronic apparatus to achieve a first function of the electronic apparatus.

In conjunction with the first possible implementation of the first aspect, in a second possible implementation, when the at least two power consumption grades include a third grade corresponding to a third power consumption greater than the second power consumption, the controlling the electronic apparatus to achieve a first function of the electronic apparatus particularly is: controlling L1 sensing units among L sensing units corresponding to the third grade to enter the ON state from the OFF state, L being a positive integer, L1 being a positive integer less than or equal to L.

In conjunction with the first possible implementation of the first aspect, in a third possible implementation, the controlling the electronic apparatus to achieve a first function of the electronic apparatus particularly is: controlling a display unit of the electronic apparatus to be in a lightening state.

In conjunction with the third possible implementation of the first aspect, in a fourth possible implementation, the determining whether the second parameter satisfies the second predetermined condition particularly is: determining whether the second parameter indicates that the display unit faces a user's face. It is indicated that the second parameter satisfies the second predetermined condition when the second parameter indicates that the display unit faces the user's face, In conjunction with the first aspect or the first to the fourth possible implementations of the first aspect, in a fifth possible implementation, the M sensing units and the N sensing units are different types of sensing units.

According to a second aspect of the present application, there is provided an electronic apparatus comprising: a housing; a processing module disposed on a surface or interior of the housing and including at least two sensing units corresponding to at least two power consumption grades, the at least two sensing units at least including M sensing units whose power consumption grades are a first grade and N sensing units whose power consumption grades are a second grade, the first grade corresponding to a first power consumption and the second grade corresponding to a second power consumption greater than the first power consumption, M and N are a positive integer; a processing chip connected with the M sensing units and the N sensing units, wherein when the electronic apparatus is in a first state, the processing chip controls the M sensing units to be in an ON state and controls the N sensing units to be in an OFF state, and when the electronic apparatus is in a second state, the processing chip controls the M sensing units to be in an ON state and N1 sensing units among the N sensing units to be in an ON state, N1 being a positive integer less than or equal to N.

In conjunction with the second aspect, in a first possible implementation, the at least two sensing units further comprise: L sensing units corresponding to a third grade of power consumption grade, the third grade corresponding to a third power consumption larger than the second power consumption, when the first electronic apparatus is in the first state or the second state, the L sensing units are in the OFF state, L being a positive integer; the processing chip is particularly for controlling L1 sensing units among the L sensing units to be in the ON state when the electronic apparatus is in a third state, L1 being a positive integer less than or equal to L.

According to a third aspect of the present application, there is provided an electronic apparatus, comprising: a processing module including at least two sensing units corresponding to at least two power consumption grades, the at least two sensing units at least including M sensing units whose power consumption grades are a first grade and N sensing units whose power consumption grades are a second grade, the first grade corresponding to a first power consumption and the second grade corresponding to a second power consumption greater than the first power consumption, M and N are a positive integer; the electronic apparatus further comprising an obtaining module for, when the N sensing units in the electronic apparatus are in the OFF state and the M sensing units in the electronic apparatus are in the ON state, obtaining a first parameter through detection of at least one sensing unit among the M sensing units; a first determining module for determining whether the first parameter satisfies a first predetermined condition; a first control module for, when the first parameter satisfies the first predetermined condition, controlling N1 sensing units among the N sensing units to be in the ON state, wherein N1 is a positive integer less than or equal to N.

In conjunction with the third aspect, in a first possible implementation, the electronic apparatus further comprises: an acquisition module for acquiring through the N1 sensing units to obtain a second parameter after controlling N1 sensing units among the N sensing units to be in the ON state; a second determining module for determining whether the second parameter satisfies a second predetermined condition; and a second control module for, when the second parameter satisfies the second predetermined condition, controlling the electronic apparatus to achieve a first function of the electronic apparatus.

In conjunction with the first possible implementation of the third aspect, in a second possible implementation, when the at least two power consumption grades include a third grade corresponding to a third power consumption greater than the second power consumption, the second control module is particularly for controlling L1 sensing units among L sensing units corresponding to the third grade to enter the ON state from the OFF state. L is a positive integer, and L1 is a positive integer less than or equal to L.

In conjunction with the first possible implementation of the third aspect, in a third possible implementation, the second control module is particularly for controlling a display unit of the electronic apparatus to be in a lightening state.

In conjunction with the third possible implementation of the third aspect, in a fourth possible implementation, the second determining module is particularly for determining whether the second parameter indicates that the display unit faces a user's face, wherein, when the second parameter indicates that the display unit faces the user's face, it is indicated that the second parameter satisfies the second predetermined condition.

In conjunction with the third aspect or the first to fourth possible implements of the third aspect, in a fifth possible implementation, the M sensing units and the N sensing units are different types of sensing units.

Beneficial effects of the present application are as follows: in the embodiments of the present application, the electronic apparatus includes M sensing units whose power consumption grades are a first grade and N sensing units whose power consumption grades are a second grade, wherein the first grade corresponds to a first power consumption and the second grade corresponds to a second power consumption greater than the first power consumption, N sensing units are in the OFF state in the initial stage, only when the M sensing units detect the first parameter that satisfies the first predetermined condition, N1 sensing units among the N sensing units are controlled to be in the ON state. That is to say, the sensing units whose power consumptions are relatively high require a trigger condition to be in the ON state. Therefore, the power consumptions of these sensing units are reduced, and further, the technical effect of reducing power consumption of the electronic apparatus is achieved.

DETAILED DESCRIPTION

Figure 1:
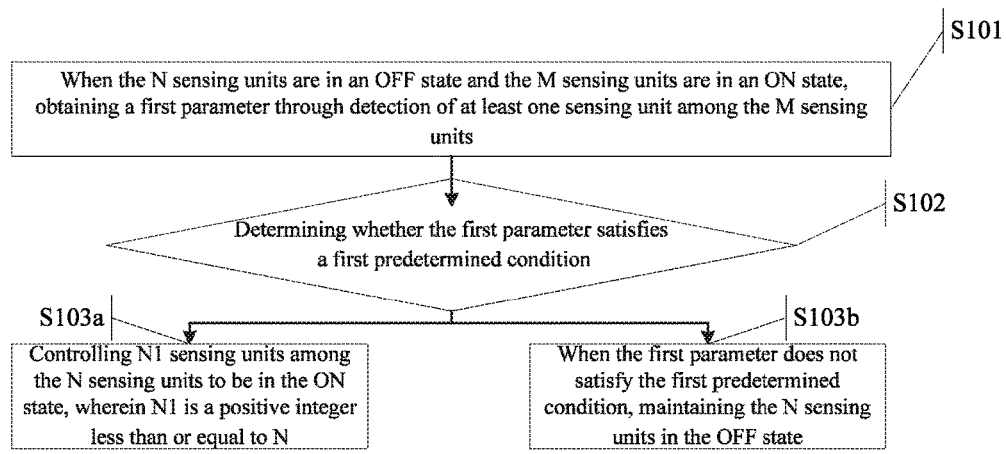
FIG. 1 is a flowchart of an information processing method in an embodiment of the present application.

Embodiments of the present application provide an information processing method and an electronic apparatus to solve the technical problem that power consumption of electronic apparatus in the prior art is relatively high.

To solve the above technical problem, general concepts of the technical solutions in the embodiments of the present application are as follows:

There is provided an information processing method applied to an electronic apparatus. The electronic apparatus includes a processing module that includes at least two sensing units corresponding to at least two power consumption grades. The at least two sensing units at least includes M sensing units whose power consumption grades are a first grade and N sensing units whose power consumption grades are a second grade. The first grade corresponds to a first power consumption, and the second grade corresponds to a second power consumption greater than the first power consumption, M and N are a positive integer. The method comprises: when the N sensing units are in an OFF state and the M sensing units are in an ON state, obtaining a first parameter through detection of at least one sensing unit among the M sensing units; determining whether the first parameter satisfies a first predetermined condition; when the first parameter satisfies the first predetermined condition, controlling N1 sensing units among the N sensing units to be in the ON state, wherein N1 is a positive integer less than or equal to N. Since the sensing units whose power consumptions are relatively high require a trigger condition to be in the ON state, thus power consumptions of these sensing units are reduced, and further the technical effect of reducing power consumption of the electronic apparatus is achieved.

To better understand the aforesaid technical solution, hereinafter, the technical solutions will be described in detail with reference to the accompanying drawings and the specific embodiments. It should be understood that embodiments of the present application and specific features thereof are detailed descriptions of the technical solutions of the present application, rather than limitations to the technical solutions of the present application. In the case of no conflict, the embodiments of the present application and specific features thereof may be combined.

In a first aspect, an embodiment of the present application provides an information processing method applied to an electronic apparatus, which is, for example, a mobile phone, a tablet computer, etc.

The electronic apparatus includes a processing module that includes at least two sensing units corresponding to at least two power consumption grades. The at least two sensing units at least includes M sensing units whose power consumption grades are a first grade and N sensing units whose power consumption grades are a second grade. The first grade corresponds to a first power consumption, and the second grade corresponds to a second power consumption greater than the first power consumption, wherein, M and N are a positive integer.

The M sensing units, for example, are at least one sensing unit among an acceleration sensing unit, a light sensing unit, a capacitive touch sensing unit. Power consumptions of these sensing units, for example, are a microampere (uA) grade.

The N sensing units, for example, are at least one sensing unit among a proximity sensing unit, a gyroscope, a voice sensing unit, a geomagnetic sending unit, a touch sensing unit. Power consumptions of these sensing units, for example, are of a milliampere (mA) grade.

As a further preferred embodiment, the M sensing units and the N sensing units are different types of sensing units.

Particularly, that is, the M sensing units and the N sensing units are respectively for detecting to obtain different parameter information. For example, the M sensing units are for detecting acceleration, light intensity, etc.; and the N sensing units are for detecting voice information, touch control parameters, etc.

Referring to FIG. 1, the method particularly comprises the following steps:

Step S101: when the N sensing units are in an OFF state and the M sensing units are in an ON state, obtaining a first parameter through detection of at least one sensing unit among the M sensing units;

Step S102: determining whether the first parameter satisfies a first predetermined condition;

Step S103a: when the first parameter satisfies the first predetermined condition, controlling N1 sensing units among the N sensing units to be in the ON state, wherein N1 is a positive integer less than or equal to N;

Step S103b: when the first parameter does not satisfy the first predetermined condition, maintaining the N sensing units in the OFF state.

In step S101, when the at least one sensing unit is different, the first parameter obtained by detecting is different. For example, if the at least one sensing unit includes an acceleration sensing unit, then the first parameter is acceleration information; if the at least one sensing unit includes a light sensing unit, then the first parameter is light intensity; if the at least one sensing unit includes a capacitive touch sensing unit, then the first parameter is touch information, and so on.

In step S102, the first predetermined condition may be a variety of predetermined conditions. For example, acceleration is greater than a preset value; or light intensity is greater than a preset value; or touch control information indicates that a touch position is a preset position, and so on.

In step S103a, when the first parameter satisfying the first predetermined condition is different, the N1 sensing units that are turned on are different. For example, if the first parameter is acceleration information and acceleration information is greater than a preset value, it may indicate that the user is starting a car, i.e., the user is about to enter a driving mode. Under this case, it is not convenient to control the electronic apparatus with hand, thus a voice sensing unit among the N sensing units is controlled to be in an ON state, so as to control the electronic apparatus based on voice. As another example, if the first parameter is light intensity and the light intensity is greater than a preset value, then it is indicated that the user may take the electronic apparatus out from his/her pocket, thus it suggests that the user possibly need to use the electronic apparatus, and a proximity sensor is controlled to be in an ON state, so as to further detect whether the user of the electronic apparatus is present, or the like.

And in step S103b, since the first parameter does not satisfy the first predetermined condition, then it indicates that the user does not need to use the N sensing units corresponding to the second grade. Therefore, the N sensing units are maintained in the OFF state.

Figure 2:
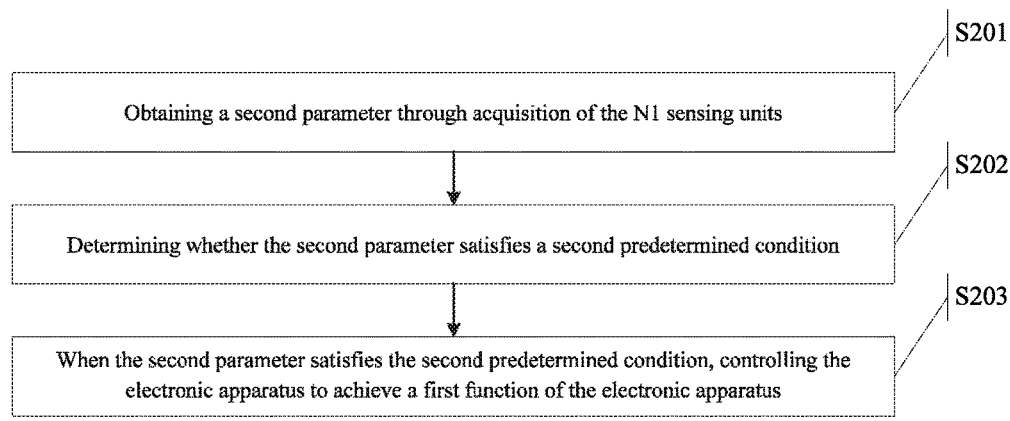
FIG. 2 is a flowchart of achieving a first function of an electronic apparatus in the information processing method of the embodiment of the present application.

As a further preferred embodiment, after controlling N1 sensing units to be in the ON state in the step S103a, referring to FIG. 2, the method further comprises:

Step S201: obtaining a second parameter through acquisition of the N1 sensing units;

Step S202: determining whether the second parameter satisfies a second predetermined condition;

Step S203: when the second parameter satisfies the second predetermined condition, controlling the electronic apparatus to achieve a first function of the electronic apparatus.

In a specific implementation, in step S201, when the N1 sensing units are different, the obtained second parameters are different. For example, if the N1 sensing units include the proximity sensing unit, then whether a user exists within a preset distance can be detected via the proximity sensing unit; if the N1 sensing units include a voice sensor, a voice control command can be obtained via the voice sensor, and so on.

In step S202, the second preset condition may be a variety of preset conditions. For example, a user exists within a preset distance: a voice control command is a preset voice control command, and so on.

In a specific implementation, in step S203, the first function may be a variety of functions, two of which will be listed below to be introduced. Of course, in a specific implementation, it is not limited to the following two cases.

In a first case, when the at least two power consumption grades include a third grade corresponding to a third power consumption greater than the second power consumption, the controlling the electronic apparatus to achieve a first function of the electronic apparatus particularly is controlling L1 sensing units among L sensing units corresponding to the third grade to enter the ON state from the OFF state. L is a positive integer, L1 is a positive integer less than or equal to L.

In a specific implementation, the L sensing units, for example, are camera, WIFI, GPS, etc. The power consumptions of these sensing units, for example, are 10 mA or more. For example, if the second parameter is a voice control command and the voice control command is Open WIFI, in this case, the WIFI in the L sensing units is to be controlled in the ON state. As another example, it is detected via a proximity sensor that a user exists within a preset distance of the electronic apparatus and a height of electronic apparatus from the ground is a preset height, then it is indicated that the electronic apparatus faces the user, thus a camera may be required to run face recognition to determine whether to control the electronic apparatus to enter an unlocked state. In this case, camera in the L sensing units is controlled to be in the ON state.

In the above solution, the electronic apparatus further comprises L sensing units corresponding to a third grade of power consumption grade, and a start can be triggered only via the sensing units whose power consumption grade is a second grade. Therefore, not only a prompt start of the sensing units of the third grade can be ensured, but also it is possible to prevent them from being mistakenly triggered, and further the technical effect of saving power consumption is achieved.

In a second case, the controlling the electronic apparatus to achieve a first function of the electronic apparatus particularly is controlling a display unit of the electronic apparatus to be in a lightening state:

Particularly that is, the second parameter information indicates that the electronic apparatus is in a state of being about to be used by the user, thus when the second condition satisfies the second preset condition, the display unit of the electronic apparatus is controlled to enter the lightening state. Since there is no need for the user to trigger manually, the technical effect of saving time is achieved. The controlling the display unit of the electronic apparatus to be in a lightening state may includes a variety of circumstances, for example, first, the electronic control device is controlled to be unlocked, then the display unit of the electronic apparatus is controlled to increase brightness; or alternatively, the electronic apparatus is not locked, in this case, only the electronic apparatus is controlled to increase brightness.

In this case, in step S202, determining whether the second parameter satisfies the second predetermined condition particularly is: determining whether the second parameter indicates that the display unit faces a user's face, wherein, when the second parameter indicates that the display unit faces the user's face, it is indicated that the second parameter satisfies the second predetermined condition.

Since the second parameter indicates that the display unit faces the user's face, it shows that the user needs to use the electronic apparatus. In this case, the electronic apparatus is controlled to be in the lightening state. There are several ways by which whether the display unit faces the user's face can be determined.

For example, whether there is a user within a preset distance of the electronic apparatus is determined via a proximity sensor, and a height of the electronic apparatus from the ground is detected via an infrared sensing unit. If there is a user within the preset distance and the height of the electronic apparatus from the ground is just within a preset height range, such as 1.4 m to 1.6 m, then it is indicated that the electronic apparatus faces the user's face.

Another example, if the N sensing units includes a camera, then it is possible to directly acquire a picture via the camera of the electronic apparatus, then it is further determined whether the electronic apparatus faces the user's face through image recognition, or the like. As for what manner is adopted to detect whether the electronic apparatus faces the user's face, the present application makes no limitation thereto.

Hereinafter, the information processing method of the electronic apparatus according to the present application will be introduced through several specific embodiments. The following embodiments mainly describe several possible application scenarios of the information processing method. It should be noted that, the embodiments of the present application are only for explaining the present application, not intended to limit the present application. All embodiments in conformity with the concept of the present application are within the protection scope of the present application. Those skilled in the art naturally know how to make variants according to the concept of the present application.

First Embodiment

Figure 3:
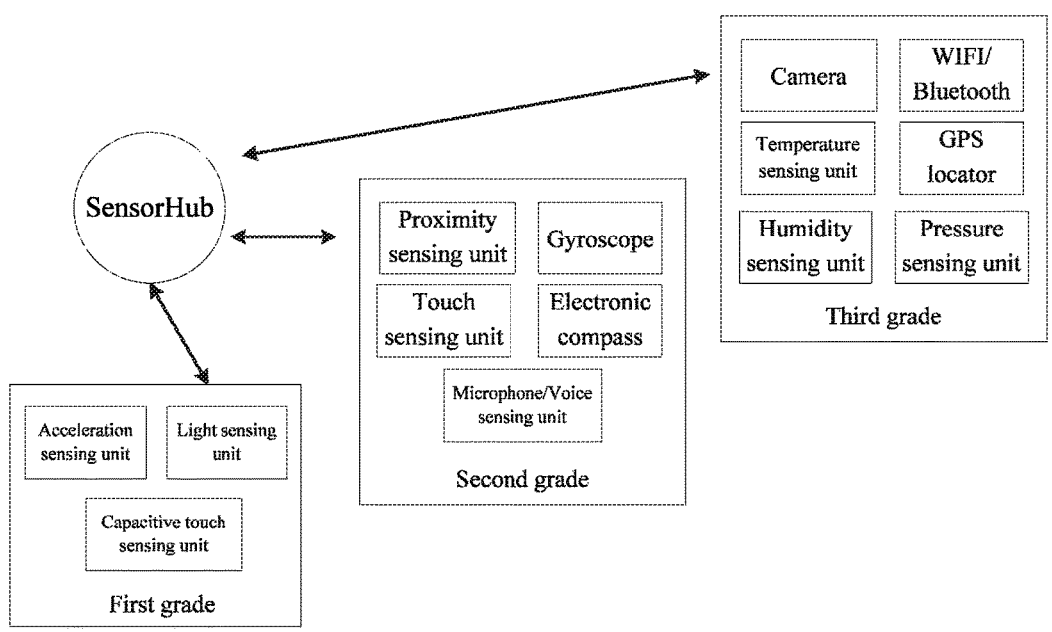
FIG. 3 is a schematic diagram of sensing units of three power consumption grades as integrated on SensorHub in a first embodiment of the present application.
Figure 4:
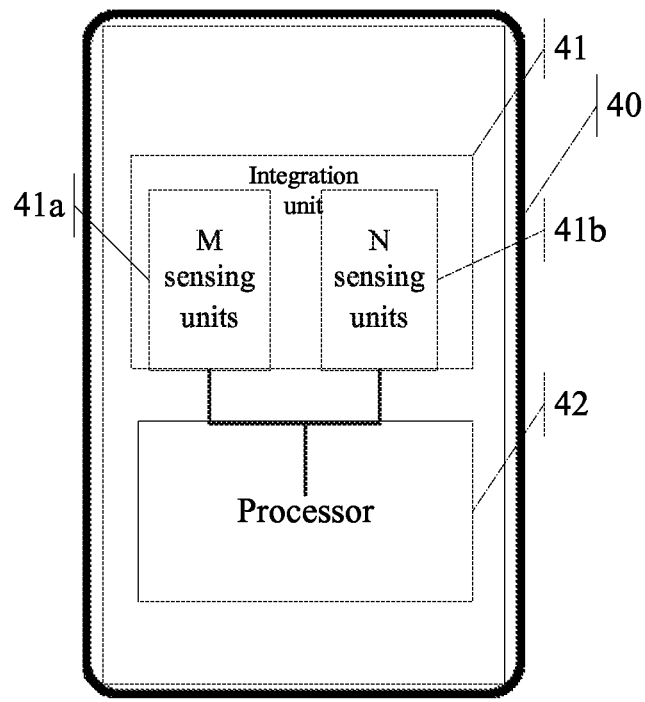
FIG. 4 is a structural diagram of an electronic apparatus in an embodiment of the present application.

In this embodiment, the information processing method is described with the electronic apparatus being a mobile phone as example. Referring to FIG. 3, a sensor hub (i.e., integration module) of the electronic apparatus includes sensing units of three power consumption grades:

a first grade, whose corresponding power consumption being less than 4 mA, particularly including light sensing unit, acceleration sensing unit, capacitive touch sensing unit;

a second grade, whose corresponding power consumption being 4 mA to 10 mA, particularly including proximity sensing unit, microphone/voice sensing unit, touch sensing unit, gyroscope, electronic compass;

a third grade, whose corresponding power consumption being 50 mA to 200 mA, particularly including camera, WIFI/Bluetooth, temperature sensing unit, GPS locator, humidity sensing unit, pressure sensing unit.

The sensing units in the first grade are always in the ON state, and the sensing units in the second grade and third grade are always in the OFF state in an initialization phase.

At time T1, the user takes out a mobile phone, the light sensing unit detects that the light intensity is greater than a preset value, thus it is first determined that the user may possible need to use the mobile phone, the proximity sensing unit in the second grade is tuned on to further determine whether the user needs to use the mobile phone.

When the proximity sensing unit detects that there is a user within a preset distance near the mobile phone, then it is indicated that the user desires to use the mobile phone. Thereafter, the mobile phone is controlled to unlock, and the screen of the mobile phone is lightened.

Second Embodiment

In this embodiment, description is provided still with the electronic apparatus being a mobile phone as example.

The mobile phone includes sensing units of two power consumption grades, which particularly are: first grade, particularly including light sensing unit, acceleration sensing unit, capacitive touch sensing unit; second grade, particularly including proximity sensing unit, microphone/voice sensing unit, touch sensing unit, camera, WIFI/Bluetooth.

At time T2, the acceleration sensing unit in the mobile phone detects that the mobile phone's acceleration is greater than a preset value, thus it is determined that the user may be in a driving state. Therefore, in order to facilitate the user to control the mobile phone, the voice sensing unit is turned on;

At time T3, other users are calling in on the mobile phone, the user produces the voice information of "answer the call". After the mobile phone recognizes the voice information, the call is answered.

In a second aspect, a second embodiment of the present application provides an electronic apparatus. Referring to FIG. 3, the electronic apparatus comprising:

a housing 40;

a processing module 41, disposed on a surface or interior of the housing 40 and including at least two sensing units, the at least two sensing units at least including M sensing units 41a whose power consumption grades are a first grade and N sensing units 41b whose power consumption grades are a second grade, the first grade corresponding to a first power consumption and the second grade corresponding to a second power consumption greater than the first power consumption, M and N are a positive integer;

a processing chip 42 connected with the M sensing units 41a and the N sensing units 41b, wherein when the electronic apparatus is in a first state, the processing chip 42 controls the M sensing units 41a to be in an ON state and controls the N sensing units 41b to be in an OFF state, and when the electronic apparatus is in a second state, the processing chip 42 controls the M sensing units 41a to be in an ON state and controls N1 sensing units among the N sensing units 41b to be in an ON state, N1 is a positive integer less than or equal to N.

Optionally, the at least two sensing units further comprise L sensing units corresponding to a third grade of power consumption grade, the third grade corresponding to a third power consumption larger than the second power consumption. When the first electronic apparatus is in the first state or the second state, the L sensing units are in the OFF state, L is a positive integer. The processing chip 42 is particularly for controlling L1 sensing units among the L sensing units to be in the ON state when the electronic apparatus is in a third state, L1 is a positive integer less than or equal to L.

The electronic apparatus described in the embodiment of the present application corresponds to the information processing method described in the embodiment of the present application. Based on the information processing method described in the embodiment of the present application, those skilled in the art can learn the basic structure and variants of the electronic apparatus described in the embodiment of the present application, therefore, no more details are described herein.

Figure 5:
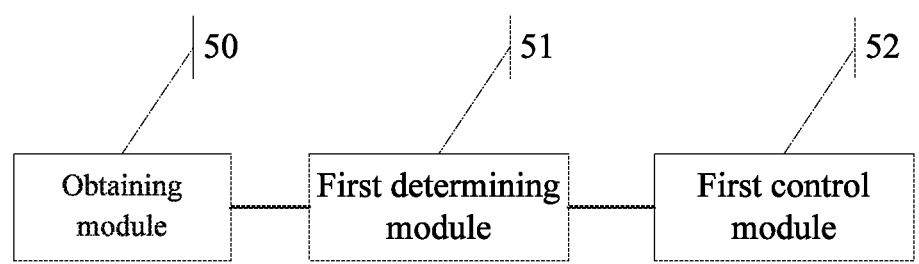
FIG. 5 is a structural diagram of an electronic apparatus in an embodiment of the present application.

In a third aspect, an embodiment of the present application provides an electronic apparatus. Referring to FIG. 5, the electronic apparatus comprises:

an obtaining module 50 for, when N sensing units in the electronic apparatus are in the OFF state and M sensing units in the electronic apparatus are in the ON state, obtaining a first parameter through detection of at least one sensing unit among the M sensing units, wherein the power consumption grades of the M sensing units are a first grade, the power consumption grades of the N sensing units are a second grade, the first grade corresponds to a first power consumption, and the second grade corresponds to a second power consumption greater than the first power consumption, M and N are a positive integer;

a first determining module 51 for determining whether the first parameter satisfies a first predetermined condition;

a first control module 52 for, when the first parameter satisfies the first predetermined condition, controlling N1 sensing units among the N sensing units to be in the ON state, wherein N1 is a positive integer less than or equal to N.

Optionally, the electronic apparatus further comprises: an acquisition module, for acquiring through the N1 sensing units to obtain a second parameter after controlling N1 sensing units among the N sensing units to be in the ON state; a second determining module for determining whether the second parameter satisfies a second predetermined condition; and a second control module for controlling the electronic apparatus to achieve a first function of the electronic apparatus when the second parameter satisfies the second predetermined condition.

Optionally, when the at least two power consumption grades include a third grade corresponding to a third power consumption greater than the second power consumption, the second control module is particularly for controlling L1 sensing units among L sensing units corresponding to the third grade to enter the ON state from the OFF state. L is a positive integer, L1 is a positive integer less than or equal to L.

Optionally, the second control module is particularly for controlling a display unit of the electronic apparatus to be in a lightening state.

Optionally, the second determining module is particularly for determining whether the second parameter indicates that the display unit faces a user's face. When the second parameter indicates that the display unit faces a user's face, it is indicated that the second parameter satisfies the second predetermined condition.

Optionally, the M sensing units and the N sensing units are different types of sensing units.

The electronic apparatus described in the embodiment of the present application corresponds to the information processing method described in the embodiment of the present application.

Based on the information processing method described in the embodiment of the present application, those skilled in the art can learn the basic structure and variants of the electronic apparatus described in the embodiment of the present application. Therefore, no more details are described herein.

The one or more technical solutions provided by the present application at least have the following technical effects or advantages.

In the embodiments of the present application, the electronic apparatus include M sensing units whose power consumption grades are the first grade and N sensing units whose power consumption grades are the second grade, wherein the first grade corresponds to a first power consumption and the second grade corresponds to a second power consumption greater than the first power consumption. The N sensing units are in the OFF state in the initialization stage. Only when the M sensing units detect the first parameter that satisfies the first predetermined condition, N1 sensing units among the N sensing units are controlled to be in the ON state. That is to say, the sensing units whose power consumptions are relatively high require a trigger condition to be in the ON state, thus power consumptions of these sensing units are reduced. And further, the technical effect of reducing power consumption of the electronic apparatus is achieved.

Those skilled in the art should understand that, the embodiments of the present application can be provided as a method, a system or a computer program product. Therefore, the present application can adopt forms of a full hardware embodiment, a full software embodiment, or an embodiment combining software and hardware aspects. And, the present application can adopt forms of a computer program product implemented on one or more computer usable storage mediums (including, but not limited to, magnetic disk storage, CD-ROM, optical memory, or the like) including computer usable program codes.

The present application is described by referring to flow charts and/or block diagrams of method, apparatus (system) and computer program product according to the embodiments of the present application. It should be understood that each flow and/or block in the flow charts and/or block diagrams and the combination of the flow and/or block in the flow charts and/or block diagrams can be implemented by computer program instructions. These computer program instructions can be provided to processing chips of a general purpose computer, a dedicated computer, an embedded processor or other programmable data processing apparatus to generate a machine, so that a device for implementing functions specified in one or more flows of the flow charts and/or one or more blocks of the block diagrams is generated by the instructions executed by the processors of the computer or other programmable data processing apparatus.

These computer program instructions can also be stored in computer readable storage which is able to direct the computer or other programmable data processing apparatus to operate in specific manners, so that the instructions stored in the computer readable storage generate manufactured articles including commander equipment, which implements functions specified by one or more flows in the flow charts and/or one or more blocks in the block diagrams.

These computer program instructions can be loaded to computer or other programmable data processing apparatus, so that a series of operation steps are executed on the computer or other programmable apparatus to generate computer implemented process, so that the instructions executed on the computer or other programmable apparatus provide steps for implementing functions specified in one or more flows of the flow charts and/or one or more blocks of the block diagrams.

Although the preferred embodiments of the present application have been described, those skilled in the art can make additional changes and modifications to these embodiments once learning the basic inventive concepts thereof. Therefore, the appended claims are intended to be interpreted as including the preferred embodiments as well as all changes and modifications that fall into the scope of the present application.

Obviously, those skilled in the art can make various modifications and variations to the present application without departing from the spirit and scope thereof. Thus, if these modifications and variations of the present application are within the scope of the claims of the invention as well as their equivalents, the present application is also intended to include these modifications and variations.

The invention claimed is:

1. An information processing method applied to an electronic apparatus, the electronic apparatus including a processing module that includes at least two sensing units corresponding to at least two power consumption grades, the at least two sensing units at least including M sensing units whose power consumption grades are a first grade and N sensing units whose power consumption grades are a second grade, the first grade corresponding to a first power consumption and the second grade corresponding to a second power consumption greater than the first power consumption, M and N being a positive integer, the method comprising:
when the N sensing units are in an OFF state and the M sensing units are in an ON state, obtaining a first parameter through detection of at least one sensing unit among the M sensing units;
determining whether the first parameter satisfies a first predetermined condition;
when the first parameter satisfies the first predetermined condition, controlling N1 sensing units among the N sensing units to be in the ON state, wherein N1 is a positive integer less than or equal to N;
wherein, when the first parameter satisfying the first predetermined condition is different, the type of the N1 sensing units that are turned on are different,
wherein, after the controlling N1 sensing units among the N sensing units to be in the ON state, the method further comprises:
obtaining a second parameter through acquisition of the N1 sensing units;
determining whether the second parameter satisfies a second predetermined condition;
when the second parameter satisfies the second predetermined condition, controlling the electronic apparatus to achieve a first function of the electronic apparatus,
wherein the determining whether the second parameter satisfies the second predetermined condition includes determining whether the second parameter indicates that the display unit faces a user's face,
when the second parameter indicates that the display unit faces the user's face, it is indicated that the second parameter satisfies the second predetermined condition,
wherein, the first parameter is a parameter determined via a proximity sensor, and the second parameter is a height of the electronic apparatus from a ground surface detected via an infrared sensing unit.

2. The method as set forth in claim 1, wherein the M sensing units and the N sensing units are different types of sensing units.

3. The method as set forth in claim 1, wherein, when the at least two power consumption grades include a third grade corresponding to a third power consumption greater than the second power consumption, the controlling the electronic apparatus to achieve the first function of the electronic apparatus includes:
controlling L1 sensing units among L sensing units corresponding to the third grade to enter the ON state from the OFF state, L being a positive integer, L1 being a positive integer less than or equal to L.

4. The method as set forth in claim 1, wherein, the controlling the electronic apparatus to achieve the first function of the electronic apparatus includes:
controlling a display unit of the electronic apparatus to be in a lightening state.

5. An electronic apparatus, comprising:
a housing;
a processing module disposed on a surface or interior of the housing and including at least two sensing units corresponding to at least two power consumption grades, the at least two sensing units at least including M sensing units whose power consumption grades are a first grade and N sensing units whose power consumption grades are a second grade, the first grade corresponding to a first power consumption and the second grade corresponding to a second power consumption greater than the first power consumption, M and N are a positive integer;
a processing chip connected with the M sensing units and the N sensing units,
wherein when the electronic apparatus is in a first state, the processing chip controls the M sensing units to be in an ON state and controls the N sensing units to be in an OFF state, and when the electronic apparatus is in a second state, the processing chip controls the M sensing units to be in an ON state and controls N1 sensing units among the N sensing units to be in an ON state, N1 is a positive integer less than or equal to N;
wherein, when the electronic apparatus is in the second state is different, the type of the N1 sensing units that are turned on are different, wherein, after the controlling N1 sensing units among the N sensing units to be in the ON state, the processing chip obtains a second parameter through acquisition of the N1 sensing units;

determines whether the second parameter satisfies a second predetermined condition;

when the second parameter satisfies the second predetermined condition, controls the electronic apparatus to achieve a first function of the electronic apparatus, wherein the determining whether the second parameter satisfies the second predetermined condition includes determining whether the second parameter indicates that the display unit faces a user's face, and when the second parameter indicates that the display unit faces the user's face, it is indicated that the second parameter satisfies the second predetermined condition, and the first parameter is a parameter determined via a proximity sensor, and the second parameter is a height of the electronic apparatus from ground surface detected via an infrared sensing unit.

6. The electronic apparatus as set forth in claim 5, wherein the at least two sensing units further comprise:

L sensing units corresponding to a third grade of power consumption grade, the third grade corresponding to a third power consumption larger than the second power consumption, wherein, when the first electronic apparatus is in the first state or the second state, the L sensing units are in the OFF state, L is a positive integer;

the processing chip is for controlling L1 sensing units among the L sensing units to be in the ON state when the electronic apparatus is in a third state, L1 is a positive integer less than or equal to L.

7. An electronic apparatus, comprising:

an obtaining module for, when N sensing units in the electronic apparatus are in the OFF state and M sensing units in the electronic apparatus are in the ON state, obtaining a first parameter through detection of at least one sensing unit among the M sensing units, the power consumption grades of the M sensing units being a first grade, the power consumption grades of the N sensing units being a second grade, the first grade corresponding to a first power consumption and the second grade corresponding to a second power consumption greater than the first power consumption, M and N being a positive integer;

a first determining module for determining whether the first parameter satisfies a first predetermined condition;

a first control module for controlling N1 sensing units among the N sensing units to be in the ON state when the first parameter satisfies the first predetermined condition, N1 being a positive integer less than or equal to N;

wherein, when the first parameter satisfying the first predetermined condition is different, the type of the N1 sensing units that are turned on are different, wherein the electronic apparatus further comprises:

an acquisition module for obtaining a second parameter by acquirement of the N1 sensing units to after the N1 sensing units among the N sensing units is controlled to be in the ON state;

a second determining module for determining whether the second parameter satisfies a second predetermined condition; and a second control module for controlling the electronic apparatus to achieve a first function of the electronic apparatus when the second parameter satisfies the second predetermined condition, wherein the second determining module is for determining whether the second parameter indicates that the display unit faces a user's face, wherein, when the second parameter indicates that the display unit faces the user's face, it is indicated that the second parameter satisfies the second predetermined condition, and the first parameter is a parameter determined via a proximity sensor, and the second parameter is a height of the electronic apparatus from a ground surface detected via an infrared sensing unit.

8. The electronic apparatus as set forth in claim 7, wherein when the at least two power consumption grades include a third grade corresponding to a third power consumption greater than the second power consumption, the second control module is for:

controlling L1 sensing units among L sensing units corresponding to the third grade to enter the ON state from the OFF state, L being a positive integer, L1 being a positive integer less than or equal to L.

9. The electronic apparatus as set forth in claim 7, wherein the second control module is for: controlling a display unit of the electronic apparatus to be in a lightening state.

10. The electronic apparatus as set forth in claim 7, wherein the M sensing units and the N sensing units are different types of sensing units.

* * * * *